INVENTORS
ROBERT B. LESHER
CLAUDE E. GREENE

Oct. 27, 1953  C. E. GREENE ET AL  2,656,589
SEMIAUTOMATIC TURRET LATHE

Filed March 2, 1948  3 Sheets-Sheet 3

INVENTORS
ROBERT B. LESHER
CLAUDE E. GREENE
BY
Woodling and Krost
Attys

Patented Oct. 27, 1953

2,656,589

UNITED STATES PATENT OFFICE 2,656,589

SEMIAUTOMATIC TURRET LATHE

Claude E. Greene and Robert B. Lesher, Sidney, Ohio, assignors to The Monarch Machine Tool Company, a corporation of Ohio Application March 2, 1948, Serial No. 12,586

13 Claims. (Cl. 29—64)

The invention relates in general to a turret lathe which is adapted to have a high speed of operation.

An object of the invention is to provide a high speed operating turret lathe wherein all controls are mounted on a small control panel convenient to the operator of the lathe.

Another object of the invention is the provision of a turret lathe having a very small set up time by electrical controls.

Another object of the invention is the provision of a turret lathe having quick indexing between the faces of the turret and a very small elapsed time for the total cycle of operation on a given workpiece.

Another object of the invention is the provision of a turret lathe having a control panel which includes all electrical controls of the lathe and with a surface speed indicator mounted on the control panel for continually indicating the surface cutting speed of the working diameter of the workpiece.

A further object of the invention is the provision of a turret lathe having variable and reversible spindle speeds in all positions of the turret and having a switch rotated in accordance with the position of the turret which switch has an additional contact between each face of the turret to provide for relieving the reverse spindle rotation in any turret position.

A still further object of the invention is the provision of a turret lathe having electronic rectifiers for supplying each the armature and field of the spindle motor and an electronic rectifier supplying energy to the feed motor for the saddle.

Yet another object of the invention is the provision of a turret lathe having rectifiers for the spindle and feed motors with continually adjustable spindle speeds in each of the positions of the turret with dynamic braking of the spindle motor to a pre-determined speed between each of the indexable positions of the turret.

Other objects and a fuller understanding of the invention may be had by referring to the following description and claims, taken in conjunction with the accompanying drawing, in which:

Figure 1:
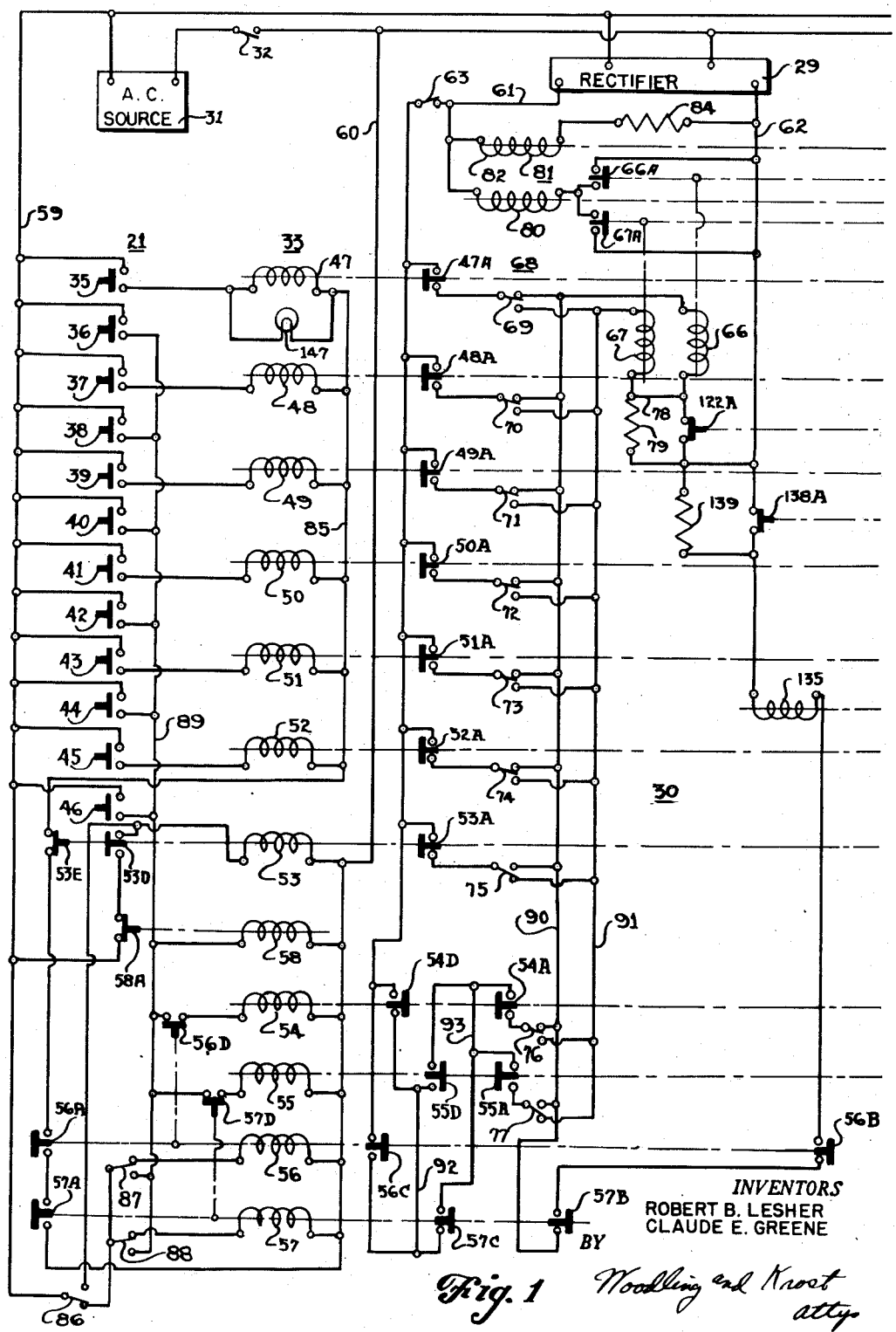
Figure 1 and Figure 2 show the electrical control system for a turret lathe.

The invention is an improvement over the application of Claude E. Greene, Serial No. 642,906 entitled "Turret Lathe," and filed January 23, 1946, now Patent No. 2,587,312, granted February 26, 1952.

The invention is directed specifically to the improvement of turret lathes wherein high speed of cycling, fast set-up time and convenience to the lathe operator are all accomplished in one machine. Such a turret lathe 11 may be as shown in the plan view of Figure 3. This turret lathe 11 is shown as including a saddle 12 on which is mounted a multi-facet turret 13 which, in this case, is shown as the conventional six-sided turret. The saddle 12 is adapted to be reciprocably moved by a capstan 14 along ways 15. A cross slide 16 is adapted for transverse movement of the ways 15 by the actuation of the cross slide capstan 17. A spindle 18 is adapted to hold the workpiece 19 which may be conveniently fed through a hollow spindle shaft 20. A rotary tap switch 21 is adapted to be rotated in accordance with the rotative position of the turret 13 and is used for the control of the electrical circuit which energizes the spindle motor 22 and feed motor 23.

Figure 2:
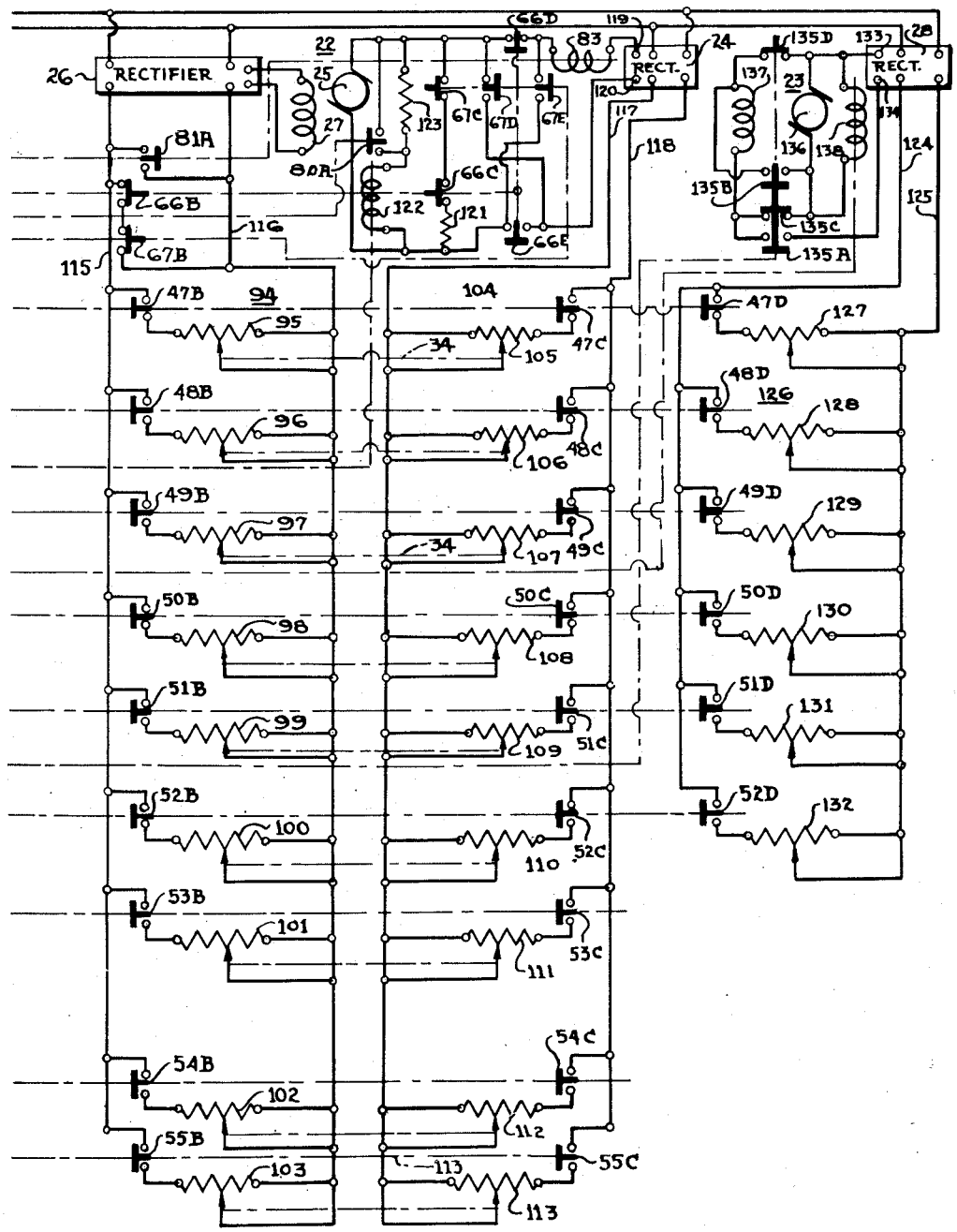
Figure 4:
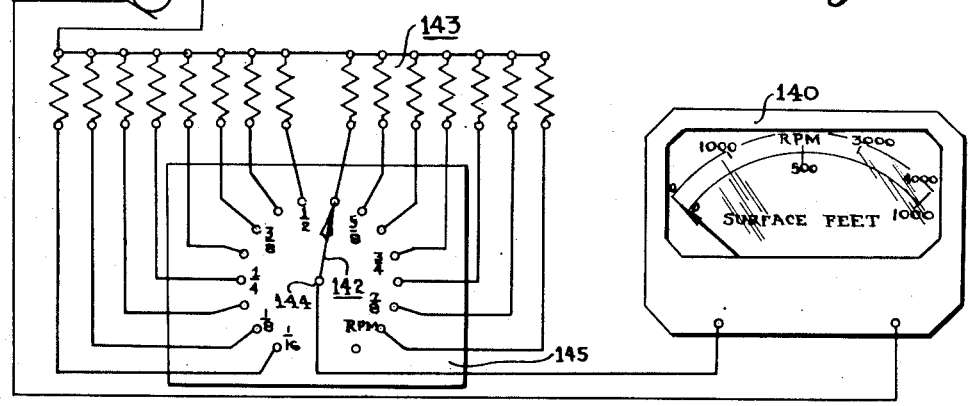
Figure 4 is an elevational view of a control panel on which is mounted all the electrical controls for the turret lathe.
Figure 4:
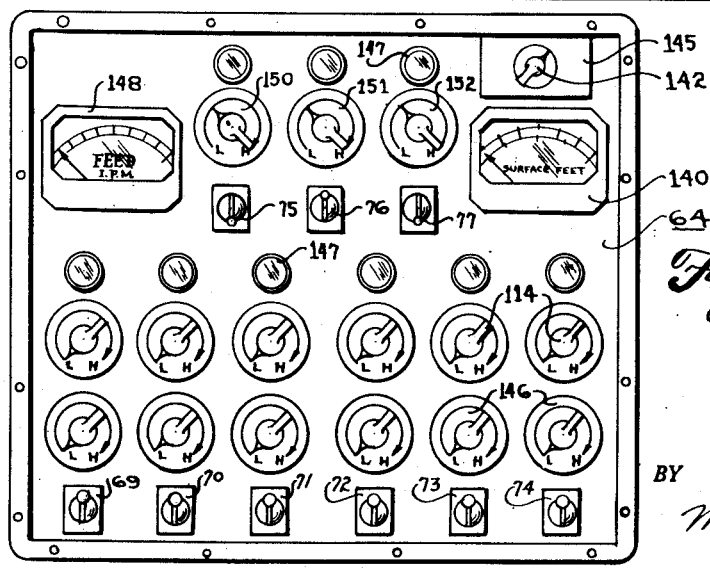

Figure 4 shows a control panel on which are mounted all of the manually operable electrical controls of the electrical circuit shown in Figures 1 and 2. The electrical circuit shown in Figures 1 and 2 includes the spindle and feed motors 22 and 23, an armature rectifier 24 for supplying rectified energy to the armature 25 of the spindle motor 22, a field rectifier 26 for supplying rectified energy to the field 27 of the spindle motor 22, a feed motor rectifier 28 for supplying rectified energy to the feed motor 23, and a control rectifier 29 for supplying rectified energy to a control circuit indicated generally by the reference character 30. The rectifiers 24, 26, 28 and 29 are adapted to be supplied with alternating current energy from an alternating current source 31 as controlled by a main switch 32.

The control circuit 30, which may be considered as including so much of the circuit as is shown in Figure 1, includes in general the rotary tap switch 21 and control relay means 33. The rotary tap switch 21 is adapted to have switch contacts of a number equal to twice the number of faces on the turret 13, which in this case will be the twelve tap contacts 35 to 46 inclusive. The odd-numbered contacts 35, 37, 39, 41, 43 and 45 correspond to the faces of the turret 13. In other words, these odd-numbered tap contacts are adapted to be actuated upon movement of the corresponding face of the turret 13 into the operative position. The even-numbered tap contacts 36, 38, 40, 42, 44 and 46 are adapted to be actuated by the movement of the turret 13 as the turret is indexed from one operative position to the next with these even-numbered tap contacts providing a function to be further described later. The control relay means 33 have a plurality of contactors which govern the operation of the lathe for all working conditions. The control relay means 33 includes first, second, third, fourth, fifth and sixth relays 47, 48, 49, 50, 51 and 52. These first to sixth relays inclusive are adapted to be energized upon the actuation of the corresponding odd-numbered tap contact. The control relay means 33 also includes a reverse tapping relay 53, a cross slide in relay 54, a cross slide out relay 55 and first, second and third time delay relays 56, 57 and 58 respectively. The first relay 47 has four normally open contactors 47A, B, C and D. Likewise, the second to sixth relays 48 to 52 have four normally open contactors A to D inclusive. The reverse tapping relay 53 has four normally open contactors 53A, B, C and D and a normally closed contactor 53E. The cross slide in relay 54 has four normally open contactors 54A to 54D inclusive. The cross slide out relay 55 has four normally open contactors 55A to 55D inclusive. The first time delay relay 56 has three normally open contactors 56A, B and C, and a normally closed contactor 56D. The second time delay relay 57 has three normally open contactors 57A, B and C, and a normally closed contactor 57D. The third time delay relay 58 has one normally closed contactor 58A.

The alternating current source 31 energizes the control circuit 30 by leads 59 and 60 through the main switch 32 with the control relay means 33 being operable from alternating current. The control rectifier 29 supplies rectified current through the leads 61 and 62 to a further portion of the control circuit 30. A master switch 63 is inserted in the lead 61 and controls the entire operation of the lathe. This master switch 63 may be mounted in a convenient location such as on the control panel 64 shown in Figure 4 or preferably mounted in a convenient location on the headstock 65 of the lathe 11 where it is readily available for stopping the lathe in any emergency. A forward relay 66 and a reverse relay 67 are adapted to be energized from the control rectifier 29 through the leads 61 and 62. The forward and reverse relays 66 and 67 each have five contactors 66A to 66E, inclusive, the contactors A, D and E being normally open, and the contactors B and C being normally closed.

Manual switch means 68 are provided to accomplish forward or reverse rotational direction of the spindle motor 22 and hence the spindle 13 in any of the operative positions of the turret 13 or the cross slide in or out positions. The manual switch means 68 includes first to sixth manual switches 69 to 74 inclusive, a reverse tapping switch 75, a cross slide in switch 76 and a cross slide out switch 77. These manual switches may be conveniently mounted on the control panel 64. These manual switch means 68 which include the switches 69 to 77 inclusive are all shown as being single pole, double throw switches which in the upper position are adapted to energize the forward relay 66 through a forward lead 90 and when in the lower position, to energize the reverse relay 67 through a reverse lead 91. Such energization of either forward or reverse relays 66 and 67 provide corresponding rotational directions of the spindle motor 22. These manual switches 69 to 77 are each respectively connected in series with a normally open contactor having the suffix "A" of the corresponding relay 47 through 55 of the control relay means 33.

One side of the forward and reverse relays 66 and 67 are connected together by a connecting link 78. In series with these paralleled forward and reverse relays 66 and 67, is a first holding resistor 79. This first holding resistor 79 has a resistance value sufficient to prevent pull in of either the forward or reverse relays 66 and 67 upon subjection of this series combination to the control voltage from the control rectifier 29, and having a resistance value insufficient to cause drop out of either the forward or reverse relays 66 and 67 after the energization and pull in of one of said forward or reverse relays 66 and 67.

The leads 61 and 62 of the control rectifier 29 are also adapted to energize a braking control relay 80 and field accelerating relay 81. The braking control relay 80 is connected in series with the paralleled combination of the forward and reverse relay contactors 66A and 67A, which contactors are normally open. The braking control relay 80 is then energized by the closing of either of these forward or reverse relay contactors 66A or 67A.

The field accelerating relay 81 has a shunt coil 82 and a series coil 83 mounted on the same core. The shunt coil 82 is for the purpose of energizing this field accelerating relay 81 to a certain degree short of pull in of this relay 81. The series coil 83 is adapted under certain conditions to provide additional energization to this field accelerating relay 81 to cause pull in thereof. A single normally open contactor 81A is provided for this field accelerating relay 81. A current limiting resistor 84 is connected in series with the shunt coil 82 of the field accelerating relay 81 to limit the current below the pull in point of this field accelerating relay 81 as aforementioned.

The control relay means 33 is adapted to be energized from the leads 59 and 60. Energizing current for the first to sixth relays 47 to 52 is provided between leads 59 and a lead 85. This lead 85 is energized through a contactor of each of the reverse tap relay 53 and the first and the second time delay relays 56 and 57 with reference characters 53E, 56A and 57A respectively. The time delay relay contactors 56A and 57A are normally open contactors and the reverse tapping relay contactor 53E is a normally closed contactor. The reverse tapping relay 53 is connected between the leads 59 and 60 through a normally closed time delay relay contactor 58A and a normally open reverse tapping relay contactor 53D. The reverse tapping relay 53 may also be energized upon the actuation of a reverse pick up switch 86. This reverse pick up switch 86 is shown as a single pole, double throw switch normally in the lower position and adapted to be actuated to the upper position by the travel of the saddle 12 to the completely forward position. This reverse tapping relay 53 may hence, as its name implies, be used to reverse the direction of the spindle motor 22 after a tapping operation so that the work may be backed off the tap. The first time delay relay 56 is connected between the leads 59 and 60 with a cross slide in switch 87 and the lower contact of the reverse pick up switch 86 connected in series with this first time delay relay 56. In a like fashion, the second time delay relay 57 is serially connected through the lower contact of the reverse pick up switch 86 and a cross slide out switch 88 between the leads 59 and 60. The cross slide in and out switches 87 and 88 are single pole, double throw switches normally in the upper position to cause energization of the first and second time delay relays 56 and 57 respectively. The lower contacts of these cross slide in and out switches 87 and 88 are connected to a lead 89 for providing energization of the third time delay relay 58.

The even-numbered tap contacts 36, 38, 40, 42, 44 and 46 are likewise connected between the lead 59 and the lead 89 to provide energization of this third time delay relay 58 upon the actuation of any of these even-numbered tap contacts. The cross slide in and cross slide out relays 54 and 55 are connected between the leads 60 and 89 with normally closed time delay relay contactors 56D and 57D in series therewith, respectively.

It will be noted that the manual switches 69 through 75 have only one contactor of the corresponding relay in series therewith. The manual switches 76 and 77, namely the cross slide in and out switches, have three normally open contactors in series therewith with this series combination connected across the lead 61 and the forward lead 90, or the reverse lead 91. The three contactors in series with the cross slide in switch 76 are the two cross slide in contactors 54D and 54A and the cross slide out contactor 55D. The three contactors in series with the cross slide out switch 77 are the first time delay relay contactor 56C, the second time delay relay contactor 57C and the cross slide out contactor 55A. Connecting leads 92 and 93 are used to interconnect the series combination of these three contactors between each successive contactor.

Figure 2 shows generally the energization circuits for the spindle and feed motors 22 and 23. The rectifiers 24, 26 and 28 which supply energy to these spindle and feed motors 22 and 23 are adapted to be controlled in speed by a plurality of variable potentiometers. These potentiometers are manually adjustable and may be mounted on the control panel 64 for ease and convenience to the operator. Field potentiometer means 94 are provided for varying the voltage output of the field rectifier 26 with a separate control potentiometer for each of the six positions of the turret 13, the reverse tapping condition and the cross slide in and out conditions. These field potentiometer means are designated by reference characters 95 to 103 inclusive, and are connected in parallel across control leads 115 and 116. The armature rectifier 24 is also adapted to have variable voltage output conditions for each of the various operating conditions of the lathe 11 with the voltage output being controlled by armature potentiometer means 104. The armature rectifier 24 has two control leads 117 and 118 across which variable resistances may be connected to provide varying amounts of output voltage of the armature rectifier 24 as supplied to the armature 25 of the spindle motor 22. The armature potentiometer means 104 includes potentiometers 105 to 113 inclusive, which correspond respectively to the six operating conditions of the turret 13, the reverse tapping condition and the cross slide in and out conditions. These armature potentiometers are connected in parallel across the control leads 117 and 118. The field potentiometers and armature potentiometers corresponding to the same operating condition of the lathe are connected together by linking means 34 for simultaneous and complementary actuation. As is well known, to provide variable speeds of a direct current shunt motor, both below and above base speeds, the applied armature voltage should first be raised from 0 to 100 per cent rated value with full field voltage, then decreasing the field voltage while maintaining rated armature voltage to provide speeds above the base speed of the motor. In accordance with this type of operation, the field and armature potentiometers are so interlinked as to provide for first increasing the armature rectifier output voltage and then decreasing the field rectifier output voltage. This provides for single control of the speed of the spindle motor through a continually variable range from 0 to some percentage above base speed, such as 200 per cent. This single control may be shown as being effected by the control knobs 114 on the control panel 64.

The rectifiers 24, 26 and 28 may be of the conventional type shown in the aforementioned patent of Claude E. Greene wherein the potentiometers are used to bias an arc discharge device such as a thyratron and wherein the minimum amount of resistance inserted in the circuit provides for the maximum output voltage. Connected across the control leads 115 and 116 of the field rectifier 26 is the normally open field accelerating relay contactor 81A thus providing full output voltage of the field rectifier 26 to the field 27 upon energization and pull in of this field accelerating relay 81. Also connected across the control leads 115 and 116 are the normally closed forward and reverse contactors 66B and 67B in series to thus provide full output voltage of the field rectifier 26 upon deenergization of both the forward and reverse relays 66 and 67. The field potentiometers 95 to 103 are each connected in series with the corresponding normally open contactor of the respective relay of the control relay means 33 across the control leads 115 and 116. Likewise, the armature potentiometers 105 through 113 are connected in series with the corresponding normally open contactor having a suffix "C" of the respective relay of the control relay means 33 across the control leads 117 and 118.

The armature rectifier 24 has two output terminals 119 and 120 for supplying the variable voltage to the armature 25. Forward and reverse relay contactors 66D and 66E, 67E and 67D are provided in the leads to the armature 25 for reversing the energization thereto and hence the rotational direction. Connected in series in one of the leads to the armature 25 is the field accelerating relay series coil 83. Connected across the armature 25 is a series combination including the normally closed forward and reverse relay contactors 66C and 67C and a dynamic braking resistance 121. Also connected across the armature 25 is the series combination of a braking relay 122 and a second holding resistor 123. Shunted across the second holding resistor 123 is a normally open braking control relay contactor 80A.

The feed motor 23 obtains its energization from the feed motor rectifier 28. This feed motor rectifier 28 is controlled by resistance connected across control leads 124 and 125 in similar fashion to the control of the field and armature rectifiers 26 and 24. Feed motor potentiometer means 126 is provided to vary the resistance connected across the control leads 124 and 125. The feed motor potentiometer means 126 includes feed motor potentiometers 127 through 132 which control the voltage output supplied to the series feed motor 23 in accordance with the control established by the control relay means 33. Each of the feed motor potentiometers 127 through 132 is connected in series with a normally open contactor having a suffix "D" of the respective first through sixth relays 47 through 52. The feed motor rectifier 28 has output terminals 133 and 134 for supplying energy to the feed motor 23. As shown in Figure 1, a feed motor relay 135 is adapted to be energized from the control rectifier 29. This feed motor relay 135 has two normally open contactors 135A and 135B, and two normally closed contactors 135C and 135D. These contactors of the feed motor relay provide for energization of the feed motor 23 from the feed motor rectifier 28 upon energization of the feed motor relay 135, and provide for dynamic braking of the feed motor 23 upon de-energization of the feed motor relay 135. The feed motor 23 has an armature 136 and a field 137 which upon the dynamic braking condition are connected in series, with the field 137 connected in a reverse manner relative to the running condition. A feed brake relay 138 is connected across the armature 136 and has one normally closed contactor 138A. This feed brake contactor 138A is shown in Figure 1 as being connected in series with the feed motor relay 135, and the first and second time delay relay contactors 56B and 57B. This series combination is connected between the lead 62 and the forward lead 90. Shunted across the feed brake contactor 138A is a third holding resistor 139.

Figure 3:
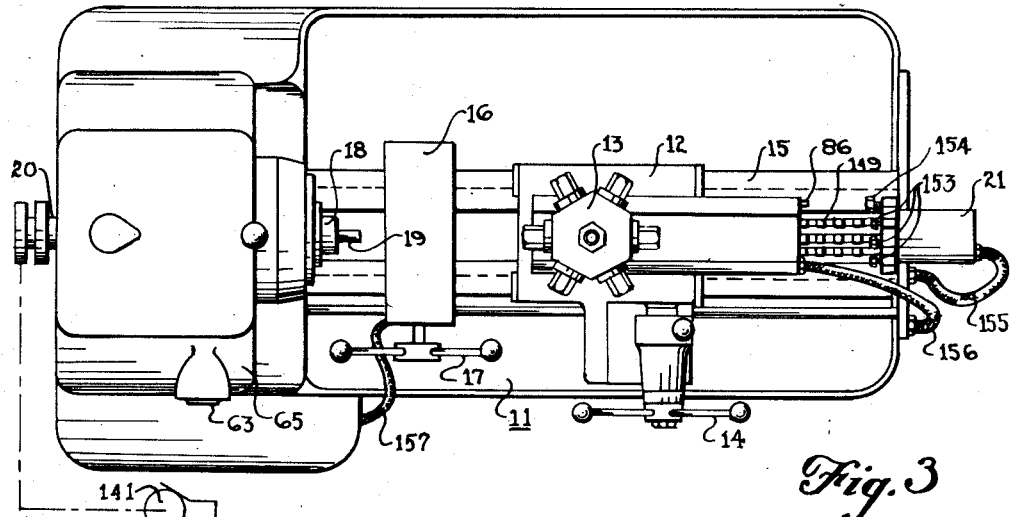
Figure 3 is a combined schematic diagram of the circuit for the surface speed indicator and a plan view of the turret lathe.

Figure 3, besides showing a plan view of the lathe 11, also shows schematically the circuit for controlling the surface speed indicator 140. The surface speed indicator has been shown as a voltmeter which may be calibrated in surface feet per minute or some other convenient calibration showing linear measure per unit of time. A tachometer genertor 141 is shown as being driven in accordance with the speed of the spindle shaft 20 and hence generates a voltage proportional to the speed of the spindle 18. The tachometer generator 141 is connected in a series circuit relation with the surface speed indicator 140 through a selector switch 142 and resistor means 143. The resistor means 143 are shown as a plurality of paralleled resistors each having one end connected to one terminal of the tachometer generator and the other end connected to a contact on the selector switch 142. The selector switch 142 has a common terminal 144 which is connected to one terminal of the voltmeter 140, and the other terminal of the voltmeter 140 is connected to the second terminal of the tachometer 141 to complete the circuit. The resistor means 143 which comprises a plurality of paralleled resistors provides varying amounts of resistance in the circuit as selected by the selector switch 142. The various amounts of resistance in the circuit correspond to various working diameters of the workpiece 19. The selector switch 142 may be mounted on the control panel 64 for convenient operation by the lathe operator with a dial 145 calibrated in various steps of the working diameter of the workpiece 19. Fourteen steps have been shown on this dial 145 which correspond to the fourteen paralleled resistors of the resistor means 143. A fifteenth position is shown and marked R. P. M. which position has been calibrated with suffi-cient resistance in the circuit to provide an indication of the R. P. M. of the spindle 18.

The surface speed indicator 140 offers a great convenience and time saving to the operator and set up man of the lathe since the operator need only measure the diameter of the workpiece, or the diameter of the tools such as a drill that is performing work upon the workpiece, and set the selector switch 142 in the correct position. By knowing the type of material and type of tool the operator may then refer to charts customarily used in the trade to obtain the work surface cutting speed for the particular work operation being performed. With the machine running in a given position, the operator may then manually adjust one of the knobs 114 to adjust the spindle speed and hence the surface cutting speed to the correct value as observed on the surface speed indicator 140. This greatly relieves the operator of any calculations in converting diameter to circumference or determining the peripheral speed for a given diameter in order to correctly use the cutting speed charts.

Figure 4 shows an elevational view of the control panel 64 whereon all the electrical controls of the lathe may be conveniently mounted for ready accessibility to the lathe operator and set up man. This control panel 64 may be mounted in any convenient position at one side or the back of the lathe 11, or could be mounted on cabinet for housing the rectifiers 24, 26, 28 and 29. The first to sixth manual switches 69 to 74 are located along the bottom of the control panel and are shown in the forward or up position. The reverse tapping switch 75, the cross slide in switch 76, and the cross slide out switch 77 are mounted in a row near the top of the control panel. As previously mentioned, the knobs 114 control the interlinked armature and field potentiometers for providing the continuously variable spindle speeds in each of the six turret positions. These knobs 114 are also conveniently mounted on the control panel in a row near the center of the control panel 64. Six knobs 146 are provided in a row below the row of knobs 114 and control the feed motor potentiometers 127 to 132 for controlling the speed of the feed motor 23. Pilot lights 147 have been shown to indicate the particular operating condition of the lathe and these pilot lights may be connected across the relays of the control relay means 33 such as indicated on Figure 1 by the pilot light 147 connected across the first relay 47. A feed rate indicator 148 shown in the form of a meter may be conveniently mounted on the control panel 64 for indicating the rate of speed of the saddle 12. This feed rate indicator 148 may be supplied with voltage from a tachometer generator driven from the feed motor 23, which circuit arrangement has not been shown.

The lathe 11 is preferably equipped with manual as well as power feed of the turret 13 with the power feed selectably engageable at the will of the lathe operator and the lathe would then have some form of mechanical trip to disengage this power feed at the most forward movement of the turret 13 in each position of the turret 13. Such a mechanical trip may be arranged to be actuated by adjusting screws 153 adjustably mounted on the stop adjustment teeth 149 to provide variations in the most forward movement for each position of the turret 13.

Actuation of the reverse pick-up switch 86 should be accomplished simultaneously with the actuation of the mechanical trip to disconnect the power feed of the turret 13. Such simultaneous actuation could be accomplished by using a large headed adjusting screw 154 to actuate this reverse pick-up switch 86 as well as the mechanical trip for the power feed.

As shown in Figure 3, the rotary tap switch 21 may be mounted on the right hand end of the turret slide for reciprocation therewith, and may be gear driven to actuate the various tap contacts 35 through 46 thereof in accordance with the rotative position of the turret 13. A flexible control cable 155 is used to bring the electrical connection from the rotary tap switch 21 to the rest of the control circuit 30. In a similar fashion, control cables 156 and 157 carry the electrical connection to the reverse pick-up switch 86 and the cross slide in and out switches 87 and 88.

*Operation of the spindle motor*

The main switch 32 must be closed to provide energization to the rectifiers 24, 26, 28 and 29 and to the control relay means 33. The first and second time delay relays 56 and 57 will be energized assuming that the cross slide 16 is in the neutral position with the saddle 12 retracted. Assuming that the turret 13 is in the number one position, the first tap contact 35 of the rotary tap switch 21 will be actuated to a closed position. Since the first and second time delay relays 56 and 57 are energized, the contactors 56A and 57A will be closed providing energization to the lead 85. Since a potential difference exists across the leads 85 and 59 and the first tap contact 35 is closed, the first relay 47 will be energized. The corresponding pilot light 147 will hence be energized and will provide an indication on the control panel 64 that the turret is in the first position and that the control circuit 30 is energized ready to provide the operating conditions to the lathe 11. The energization of the first relay 47 closes the contactors A to D of this relay. The field accelerating relay 81 has the shunt coil 82 thereof energized to provide a slight degree of energization to this relay 81. The master switch 63, which has been shown as being located in the headstock 65, may then be closed to provide energization to the forward and reverse relays 66 and 67. The manual switches 69 to 74 have all been shown in the forward position and likewise the cross slide in switch 76 is shown in the forward position. The reverse tapping switch 75 and cross slide out switch 77 have been shown in the reversed position. This will be the normal position for these switches since one normally desires forward rotation of the spindle 18 for all positions of the turret and for a tool being held on the front part of the cross slide 16. Thus when the cross slide moves inwardly to cause this tool on the front of the cross slide 16 to perform work upon the workpiece 19, the spindle 18 should revolve in a forward direction. When the cross slide 16 moves out or, in other words, causes a tool mounted on the back of the cross slide to perform work upon the workpiece 19, then the spindle should rotate in a reverse direction. Likewise a reverse rotational direction of the spindle 18 should be provided in order to back a tap out of the work, which tap is held by a chuck in any position of the turret 13. This reverse tapping condition may be initiated in any of the positions of the turret and may conveniently be effected by providing a mechanical actuation of the reverse pick-up switch 86 at the most forward point of the tap. This reversing of the spindle 18 then drives the tap out of the workpiece 19.

With the first manual switch 69 in the forward position, the closing of the contactor 47A causes energization of the forward relay 66 since the braking relay contactor 122A is closed. The energization of the forward relay 66 closes the contactors 66D and 66E to provide energization to said spindle motor armature 25 in a direction to cause forward rotation of the spindle motor 22. Also the contactor 66C is opened to release the dynamic braking resistance 121 from its connection across the armature 25. The contactor 66B is opened to prevent the short circuit across the control leads 115 and 116 of the field rectifier 26; hence causing the output voltage of this field rectifier 26 to be controlled by the field potentiometer 95 since the contactor 47B is closed. The spindle motor 22 hence comes up to a speed dictated by the settings of the field and armature potentiometers 95 and 105 since the contactor 47C is closed to provide control of the armature rectifier 24 by the armature potentiometer 105. The contactor 66A closes to cause energization of the braking control relay 80. The energization of this braking control relay 80 closes the contactor 80A thereof which shunts the second holding resistor 123. The second holding resistor 123 has a resistance value sufficient to prevent pull in of the braking relay 122 upon subjection of the series combination of the second holding resistor 123 and the braking relay 122 to the rated armature voltage. The resistance value of the second holding resistor 123 also is insufficient to cause drop out of the braking relay 122 upon energization and pull in thereof. The closing of the contactor 80A and the shunting of this second holding resistor 123 then provides for the energization of the braking relay 122 with a consequent opening of the contactor 122A. This braking relay contactor 122A, upon being opened, does not cause drop out of the forward relay 66 since the first holding resistor 79 does not have a resistance value, with a corresponding voltage drop, of sufficient value.

The invention provides for a quick change of speed between one operating condition and the next, such as between the first and second positions of the turret. The braking system provides for such quick change of speed in the following manner: Assuming that the turret is to be changed from the first to the second position, the rotary tap switch 21 will then cause actuation of the third tap contact 37 in this position and in so moving to this second position of the turret, the second tap contact 36 will be actuated. Before the third tap contact 37 is actuated, the first tap contact 35 will be de-actuated to the open condition. This de-energizes the first relay 47 opening all contactors thereof. Opening the contactors 47B and 47C releases the field and armature rectifiers 26 and 24 from the control of the field and armature potentiometers 95 and 105. The opening of the contactor 47A drops out the forward relay 66 opening the contactors 66D and 66E and closing the contactor 66C to provide dynamic braking of the spindle motor armature 25 through the dynamic braking resistance 121. The contactor 66B closes to provide full field excitation of the field 27 to aid this dynamic braking. The contactor 66A opens to drop out the braking control relay 80 and opens the contactor 80A thereof. This places the second holding resistance 123 in series with the braking relay 122 and since this second holding resistance 123 will have a voltage drop thereacross, the braking relay 122 will drop out at a much higher armature voltage than if that braking relay 122 were to be connected directly across the armature 25. Thus the second holding resistor 123 provides an adjustment for the minimum speed to which the spindle motor 22 is braked during change between one operating condition and the next. Since the voltage on which the ordinary relay will hold in is considerably lower than the pull in voltage or especially the rated voltage thereof, approximately 20–25 per cent, this second holding resistor 123 thereby provides a calculated change in the drop out voltage of the braking relay 122.

When the braking relay 122 drops out, the contactor 122A thereof closes to shunt the first holding resistor 70. By this time, the third tap contact 37 will have been closed by the indexing of the turret 13 to the second position thereof and hence the second relay 48 will have been pulled in to close the four contactors thereof. With the contactor 48A closed and the second manual switch 70 in the forward position, the forward relay 66 will then be energized sufficiently to pull in upon the closing of the braking relay contactor 122A. The cycle of operation as previously described will then be duplicated. In other words, the spindle motor 22 will come up to speed dictated by the settings of the field and armature potentiometers 96 and 106. Also, the braking control relay 30 will be energized, energizing the braking relay 122 to open the contactor 122A thereof. Such a process of braking to a pre-determined speed and re-accelerating to the new speed condition will be accomplished each time the turret 13 is indexed to a new operative position.

The operation of the circuit as governed by the reverse pick-up switch 86 may be accomplished in any operative condition of the lathe wherein the spindle 18 is rotating in a reverse direction. For instance, one position of the turret 13 may be to drill a hole in the workpiece 19 and the next operative position of the turret may be to tap threads on the internal bore of this hole. When the tap has reached the bottom of the hole a mechanical trip may be caused to actuate the reverse pick-up switch 86 in any position of the turret 13 and would be set to so trip this reverse pick-up switch 86 at the instant of completion of the tapping operation. This reverse pick-up switch 86 then contacts the upper contact thereof to energize the reverse tapping relay 53. The contactor 53D thereof closes as a holding contactor to keep this reverse tapping relay 53 energized. The contactor 53E thereupon opens to prevent control of the operation of the lathe by any of the first to sixth relays 47 to 52. The opening of the contactor 53E thereupon causes de-energization of the second relay 48 or whichever of the first to sixth relays 47 to 52 is at that time effecting control of the lathe. This de-energization of one of the first to sixth relays will cause a de-energization of the forward relay 66 and hence the spindle motor 22 will be dynamically braked. The contactor 53A closes and with the reverse tapping switch 75 in the reverse position, the reverse lead 91 is energized to energize the reverse relay 67. The energization of this reverse relay 67 performs a cycle of operation similar to the operation performed by the energization of the forward relay 66. The reverse relay contactors 67D and 67E close to energize the spindle armature 25 in a reverse direction. The contactor 67C opens to relieve the spindle motor armature 25 from its dynamic braking action. The contactor 67B opens to release the short across the control leads 115 and 116 and place the field rectifier 26 under the control of the field potentiometer 101. The armature rectifier 24 will be under the control of the armature potentiometer 111, since the contactor 53C will be closed. The spindle motor 22 will then come up to a reverse rotational speed dictated by the setting of the knob 114 which simultaneously governs the position of the movable fingers on the potentiometers 101 and 111. The closing of the contactor 67A causes energization of the braking control relay 80 to close the contactor 80A thereof and hence cause energization of the braking relay 122 which opens the contactor 122A. The circuit is then in the stable running condition with the spindle motor 22 running in a reverse direction to back the tap from the workpiece 19.

The even-numbered tap contacts 36, 38, 40, 42, 44 and 46 are all connected to the lead 89 which is provided to energize the third time delay relay 58. As is conventional practice, the turret is indexed to the next position thereof upon a complete retraction of the saddle 12. As previously stated, during this indexing, one of the even-numbered tap contacts will be actuated to the closed position. For instance, if the tap had been held by a chuck on the fifth position of the turret 13, then the reverse tapping condition would have been initiated at the end of this tapping operation and during the indexing from the fifth to the sixth position, the tenth tap contact 44 would have been actuated to cause energization of the lead 89, hence energizing the third time delay relay 58. Such energization opens the contactor 58A to drop out the reverse tapping relay 53. Since this opens the contactor 53A, the reverse relay 67 drops out and the spindle motor 22 is dynamically braked. When the eleventh tap contact 45 is energized, and after the braking relay contactor 122A closes, the sixth relay 52 will be energized to close the four contacts thereof. When the contactor 52A closes, the forward relay 66 will be energized just as soon as the braking relay contactor 122A closes, to resume forward rotation of the spindle motor 22 under control of the potentiometers 100 and 110.

It will be seen that the reverse tapping operation can be used after any of the six operative positions of the turret 13 and the circuit will provide for a resumption of forward rotation after this reverse rotation since there is an even-numbered tap contact between each odd-numbered contact that establishes the operative condition for each of the positions of the turret 13.

The cross slide in and cross slide out positions are provided so that continuously variable spindle speeds may be effected to vary the surface cutting speed when the workpiece 19 is being worked by a tool held on either the front or the back of the cross slide 16. The cross slide in condition may be controlled in spindle speed by the knob 150, shown on the control panel 64 in Figure 4, which controls simultaneously and complementarily the potentiometers 102 and 112. The cross slide out condition may be controlled in spindle speed by the knob 151 which in a similar fashion controls the potentiometers 103 and 113. The knob 152 may be used to control the spindle speed during the reverse tapping condition. When the lathe condition is being controlled by one of the first to sixth relays 47 to 52, the reverse pick-up switch 86 is in the normal or lower position which causes energization of the first and second time delay relays 56 and 57. Initial movement of the cross slide 16 either in or out will cause actuation of the respective cross slide in or cross slide out switch 87 or 88. For an inward movement of the cross slide 16, the cross slide in switch 87 will be actuated to the lower position causing drop out of the first time delay relay 56. The opening of the contactor 56A prevents control of the lathe by any of the first to sixth relays 47 to 52 hence dropping out the forward or reverse relay 66 or 67, whichever had previously been actuated to dynamically brake the spindle motor 22. The contactor 56D closes to provide energization of the cross slide in relay 54 with consequent closing of the four contactors A to D thereof. The closing of the contactor 54D permits current to flow through the line 61, the contactor 54D, the connecting lead 92, the second time delay contactor 57C, the connecting lead 93, the cross slide in contactor 54A, the cross slide in switch 76 and the forward lead 90 to energize the forward relay 66. The spindle motor 22 will then come up to a speed dictated by the settings of the potentiometers 102 and 112. When the cross slide is returned to the normal position, the cross slide in switch 87 will be returned to the normal or upper position to drop out the cross slide in relay 54 and to re-energize the first time delay relay 56. The opening of the contactors 54D and 54A drops out the forward relay 66 and dynamically brakes the spindle motor 22. Should the cross slide be moved outwardly, the cross slide out switch 88 would be actuated, de-energizing the second time delay relay 57, closing contactor 57B to energize the cross slide out relay 55. Current would then flow from the control rectifier 29 through the lead 61, the first time delay relay contactor 56C, the connecting lead 92, the cross slide out contactor 55D, the connecting lead 93, the cross slide out contactor 55A, the cross slide out switch 77, and the reverse lead 91 to energize the reverse relay 67 upon the close of the braking relay contactor 122A. The spindle motor 22 will hence come up to a reverse rotational speed dictated by the settings of the potentiometers 103 and 113.

The lower contacts of the single pole, double throw cross slide in and out switches 87 and 88 are connected to the lead 89 for energization thereof upon the actuation of either of these cross slide switches to energize the third time delay relay 58 and hence drop out the reverse tapping relay 53 should it happen to be energized. Thus, the movement of the cross slide 16 either in or out will cause drop out of the reverse tapping condition in the same fashion as the indexing to a new position of the turret 13 with consequent actuation of any of the even-numbered tap contacts on the rotary tap switch 21.

The field accelerating relay 81 comes into play when the spindle motor 22 is to be accelerated to some speed above base speed. The armature rectifier 24 will be attempting under this condition, to supply a heavy current to the armature 25 to accomplish this increase in speed since the field 27 will have a low excitation. Such a heavy inrush of current will go through the series field accelerating coil 83 and the lines of flux established in the core thereby, aided by the shunt coil 82, will cause a pull in of this field accelerating relay 81. The contactor 81A will thereby become closed to short the control leads 115 and 116 to provide full excitation to the field 27. This closing of the contactor 81A relieves this field rectifier 26 from whichever field potentiometer normally has control in that particular operative condition of the lathe. When the field 27 receives this full excitation, the rush of current from the armature rectifier 24 will be diminished since the spindle motor 22 will no longer be under this accelerating influence. The series coil 83 will therefore add very few flux lines to the core of the field accelerating relay 81 and hence this relay will drop out to open the contactor 81A thereof. The field rectifier 26 will therefore again be placed under control of one of the field potentiometers to provide the weak field excitation necessary for the pre-set speed above base speed. This again will cause a heavy inrush of current to the armature 25 to pull in the field accelerating relay 81. This cycle of operation may continue for a number of cycles with the field accelerating relay chattering until the spindle motor 22 is accelerated to the correct speed. The purpose of the field accelerating relay 81 is to prevent a heavy inrush of current to the armature and is in the nature of a protective device to protect the arc discharge devices of the armature rectifier from heavy overloads. This is a superior method of overload protection for it does not cause a disruption in the operation of the lathe and permits the spindle motor 22 to accelerate to the pre-set speed above base speed as rapidly and at as high a current rating as the arc discharge devices of the armature rectifier 24 will safely permit.

Operation of the feed motor

The feed motor 23 is adapted to be controlled through a continuously variable speed range to provide continuously variable rates of speed of the turret 13. This permits optimum operating condition of the lathe for any particular cut or work operation on the workpiece 19. When the main switch 32 is closed, the feed motor rectifier 28 will be energized, also the leads 59 and 60 will be energized to cause energization and pull in of the first and second time delay relays 56 and 57 and the consequent closing of the contactors 56B and 57B thereof will permit energization of the feed motor relay 135. When the master switch 63 is closed, the output voltage from the control rectifier 29 will be applied through one of the first to sixth relay contactors to the forward lead 90, and since the contactors 56B and 57B are closed, the feed motor relay 135 will become energized since the feed brake relay contactor 138A is closed. The third holding resistor 139 has a resistance value sufficient to prevent pull of the feed motor relay 135 upon subjection of this series combination to the control voltage from the control rectifier 29. The resistance value of this third holding resistor 139 is, however, insufficient to cause drop out of the feed motor relay 135 after energization and pull in thereof, such as can be effected by shunting the third holding resistor 139. The energization of the feed motor relay 135 opens the contactors 135C and D to release the feed motor 23 from its dynamic braking condition. The contactors 135A and 135B close to provide energization to this feed motor 23 from the feed motor rectifier 28 with the field 137 and armature 136 connected in series. The feed motor 23 will then come up to speed dictated by the setting of whichever feed motor potentiometer 127 through 132 that is in control at that time. For instance, if the turret 13 is in the first position, the first relay 47 will be energized closing the contactor 47D and permitting the feed motor potentiometer 127 to control the output voltage of the feed motor rectifier 28. The feed brake relay 138 will energize by normal armature voltage and will cause opening of the contactor 138A thereof. This relieves the shunt across the third holding resistor 139, however, the feed motor relay 135 still holds in. Upon a changing of the turret to the next operative position, a new feed rate of the turret 13 may be desired and hence may be controlled by the setting of the appropriate feed motor potentiometer, in this case the potentiometer 128. When the turret 13 is indexed to this next position, which in this example is the second position, the first relay 47 will drop out opening the contactor 47D hence placing an infinite impedance across the control leads 124 and 125 to cause the output voltage of the feed motor rectifier 28 to drop to a minimum value. The drop out of the first relay 47 will open the contactor 47A de-energizing the forward lead 90 and hence dropping out the feed motor relay 135. The contactors 135A and B open and the contactors 135C and D close to provide dynamic braking to the feed motor with the field 137 reversed from the connection during the running condition. The feed motor 23 is hence rapidly braked to a stop. The feed brake relay 138, which is dependent upon the voltage across the armature 136, will hold in until the voltage across this armature 136 has dropped to the drop out voltage value of this feed brake relay 138. This permits time for the dynamic braking of the feed motor 23 before the closing of the contactors 138A will permit the feed motor relay 135 to again pull in. Upon pull in of this feed motor relay 135, the dynamic braking condition of the feed motor 23 is released and it is reconnected to the feed motor rectifier 128 and will come up to a speed dictated by the setting of the second feed motor potentiometer 128.

What is claimed is:

1. In a turret lathe having a spindle and a turret with a given number of indexable positions, drive means for driving said spindle, energization means connected in circuit with said drive means, means for controlling the energization supplied to said drive means and including movable switch means driven in accordance with the rotation of said turret, said movable switch means having twice said given number of positions, the odd numbered positions corresponding to the said given number of indexable positions of said turret to provide different speed conditions for each of said indexable positions, reversing means for providing reversal of said spindle, and circuit means controlled by the even numbered positions providing for relieving the reverse rotation of said spindle under the control of said reversing means.

2. In a turret lathe having a spindle and a turret with a given number of indexable positions a spindle motor, drive means for energizing said spindle motor, control means for providing variable amounts of energization of said drive means to provide varying speeds to said spindle motor, said control means including a switch driven in accordance with the position of said turret, said switch having twice said given number of positions with the odd-numbered positions thereof corresponding to said given number of indexable positions of said turret, connection means interconnecting said odd-numbered positions of said switch and said control means to provide different amounts of energization of said drive means and hence providing different spindle speed conditions in each indexable position, a reversing switch for at least one of said indexable positions to provide reversed rotation of said spindle motor, and circuits connected to the even-numbered positions of said switch providing for relieving the reverse rotation of said spindle under the control of said reversing switch.

3. In a turret lathe having a spindle and a turret with a given number of indexable positions, a spindle motor, drive means for energizing said spindle motor, control means for providing variable amounts of energization of said drive means to provide varying speeds to said spindle motor, said control means including a switch driven in accordance with the position of said turret, said switch having twice said given number of positions and having at least one electrical contact for each position with the alternate positions thereof and corresponding electrical contacts corresponding to said given number of indexable positions of said turret, circuits interconnecting said electrical contacts corresponding to said alternate positions of said switch and said control means to provide different amounts of energization of said drive means and hence providing different spindle speed conditions in each indexable position, reversing means for reversing the rotation of said spindle motor, and means interconnecting the other positions of said rotary switch and said control means for relieving the control established by said reversing means.

4. In a turret lathe having a spindle and a slidable saddle, a turret rotatively mounted thereon and having a given number of indexable positions, a spindle motor, drive means for energizing said spindle motor, control means for providing variable amounts of energization of said drive means to provide varying speeds to said spindle motor, said control means including a contact carrying switch operated in accordance with the position of said turret, said switch having twice said given number of positions with the alternate positions thereof corresponding to said given number of indexable positions of said turret, electric circuit means interconnecting said alternate positions of said rotary switch and said control means to provide different amounts of energization of said drive means and hence providing different spindle speed conditions in each indexable position, a reverse pick-up switch actuable in one of said indexable positions by said slidable movement of said saddle to reverse the rotation of said spindle motor and to render ineffective the control established by all of said alternate positions, and means controlled by the other positions of said rotary switch for providing cessation of reverse rotation of said spindle motor.

5. In a turret lathe having a spindle and a slidable saddle, a turret mounted on said saddle and having six rotative indexable positions, a spindle motor, drive means for energizing said spindle motor, control means including variable means for controlling the degree of energization of said drive means to provide varying speeds to said spindle motor, said control means including a rotary switch rotated in accordance with the rotation of said turret, said rotary switch having a contactor in each of twelve positions with the odd-numbered contactors thereof corresponding to said six indexable positions of said turret, six indexing relays each energizable by the actuation of one of said odd-numbered contactors respectively, connection means interconnecting said odd-numbered contactors of said rotary switch and said variable means of said control means to provide variable forward rotational speeds of said spindle motor in each of said indexable positions, a reverse pick-up switch actuable by said slidable movement of said saddle with said turret in one of said indexable positions, a reverse relay energizable by the actuation of said reverse pick-up switch to provide reverse rotation of said spindle motor, a reverse control contactor on said reverse relay to de-energize all of said indexing relays and hence render ineffective the control established thereby, and a forward control relay energizable upon actuation of any of the even-numbered contactors of said rotary switch for de-energizing said reverse relay to thereby condition said control means for forward rotation of said spindle motor under the control of one of said six indexing relays.

6. A control circuit for a turret lathe having a spindle motor, said spindle motor having an armature, armature energization means capable of energizing said armature, control relay means for energizing said spindle motor upon being energized, dynamic braking means including means for disconnecting said armature energization means from said armature and contact means for connecting a dynamic braking resistance thereacross, control voltage means capable of energizing said control relay means, a first holding resistor connected in series with said control relay means and having a resistance value sufficient to prevent pull-in of said control relay means upon subjection of said series combination to said control voltage and insufficient to cause drop-out of said control relay means after pull-in thereof, a braking relay and a second holding resistor serially connected across said armature with said second holding resistor having a resistance value sufficient to prevent pull-in of said braking relay on normal armature voltage applied to said last named series combination and insufficient to cause drop-out of said braking relay on normal armature voltage after said braking relay has been energized, a normally closed braking relay contactor bridging said first holding resistor, a braking control relay, means for energizing said braking control relay upon energization of said armature from said armature energization means, and a normally open braking control relay contactor bridging said second holding resistor.

7. A control circuit for a turret lathe having a spindle motor, said spindle motor having an armature, an armature rectifier for supplying rectified A. C. power to said armature, control means for controlling the energization of said spindle motor, said control means including switch means, control relay means energizable by said switch means, dynamic braking means including means for disconnecting said armature rectifier from said armature and contact means for connecting a dynamic braking resistance thereacross, control voltage means capable of energizing said control relay means, a first holding resistor connected in series with said control relay means and having a resistance value sufficient to prevent pull-in of said control relay means upon subjection of said series combination to said control voltage and insufficient to cause drop-out of said control relay means after pull-in thereof, a braking relay and a second holding resistor serially connected across said armature with said second holding resistor having a resistance value sufficient to prevent pull-in of said braking relay on normal armature voltage applied to said last named series combination and insufficient to cause drop-out of said braking relay on normal armature voltage after said braking relay has been energized, a normally closed braking relay contactor bridging said first holding resistor, a braking control relay, means for energizing said braking control relay upon energization of said armature from said armature rectifier, and a normally open braking control relay contactor bridging said second holding resistor.

8. A control circuit for a turret lathe having a spindle motor, said spindle motor having an armature, an armature rectifier for supplying rectified A. C. power to said armature, control means for controlling the energization of said spindle motor and hence the speed thereof, said control means including switch means for providing variable speeds to said spindle motor, forward and reverse relays selectably energizable by said switch means, dynamic braking means including means for disconnecting said armature rectifier from said armature and contact means for connecting a dynamic braking resistance thereacross, control voltage means capable of energizing said forward or reverse relays, a first holding resistor connected in series with said forward and reverse relays and having a resistance value sufficient to prevent pull-in of said relays upon subjection of said series combination to said control voltage and insufficient to cause drop-out of said relays after one of said relays has pulled-in, a braking relay and a second holding resistor serially connected across said armature with said second holding resistor having a resistance value sufficient to prevent pull-in of said braking relay on normal armature voltage applied to said last named series combination and insufficient to cause drop-out of said braking relay on normal armature voltage after said braking relay has been energized, a normally closed braking relay contactor bridging said first holding resistor, a braking control relay, means for energizing said braking control relay upon energization of said armature from said armature rectifier, and a normally open braking control relay contactor bridging said second holding resistor.

9. A control circuit for a turret lathe having a spindle motor, said spindle motor having a field winding and an armature, an armature rectifier for supplying rectified A. C. power to said armature, a field rectifier for supplying rectified A. C. power to said field winding, a saddle slidable on said lathe, a turret mounted on said saddle and having six indexable positions, control means for controlling the energization of said spindle motor and hence the speed thereof, said control means including switch means having six conditions corresponding to said six indexable positions of said turret for providing variable speeds to said spindle motor in each of said indexable positions, forward and reverse relays selectably energizable by said switch means in any of said six conditions for providing forward or reverse rotation of said spindle motor, dynamic braking means including means for disconnecting said armature rectifier from said armature and contact means for connecting a dynamic braking resistance thereacross, control voltage means capable of energizing said forward or reverse relays, a first holding resistor connected in series with said forward and reverse relays and having a resistance value sufficient to prevent pull-in of said relays upon subjection of said series combination to said control voltage and insufficient to cause drop-out of said relays after one of said relays has pulled-in, a braking relay and a second holding resistor serially connected across said armature with said second holding resistor having a resistance value sufficient to prevent pull-in of said braking relay on normal armature voltage applied to said last named series combination and insufficient to cause drop-out of said braking relay on normal armature voltage after said braking relay has been energized, a normally closed braking relay contactor bridging said first holding resistor, a braking control relay, means for energizing said braking control relay upon energization of said armature from said armature rectifier, and a normally open braking control relay contactor bridging said second holding resistor.

10. A turret lathe having a spindle motor with an armature, power means for supplying power to said armature, a turret mounted on said lathe and having a given number of indexable positions, control means for controlling the energization supplied by said power means to said spindle motor and hence the speed thereof, said control means including indexing switch means actuated in accordance with the position of said turret, said indexing switch means having twice said given number of contact positions with the odd-numbered positions thereof corresponding to said given number of indexable positions of said turret, a forward relay, connection means interconnecting said odd-numbered contact positions of said indexing switch means and said forward relay for energization thereof to provide forward rotation of said spindle motor in each of said indexable positions, a reverse relay, means for energizing said reverse relay to provide a reverse rotation of said spindle motor and to render ineffective the control established by said forward relay, forward control means energizable upon actuation of any of the even-numbered positions of said indexing switch means for de-energizing said reverse relay to thereby restore the spindle motor to the control of said odd-numbered positions of said indexing switch means, dynamic braking means for dynamically braking said spindle motor during movement of said turret from one indexing position to another, said dynamic braking means including means for disconnecting said power means from said armature and connecting a dynamic braking resistance thereacross, control voltage means capable of energizing said forward and reverse relays, a first holding resistor serially connected to said forward and reverse relays, said first holding resistor having a resistance value sufficient to prevent pull-in of either of said forward or reverse relays upon subjection of said series combination to said control voltage and insufficient to cause drop-out of said relays after one of said forward or reverse relays has pulled in, a braking relay and a second holding resistor serially connected across said armature with said second holding resistor having a resistance value sufficient to prevent pull-in of said braking relay on normal armature voltage applied to said last named series combination and insufficient to cause drop-out of said braking relay on normal armature voltage after said braking relay has been energized, a normally closed braking relay contactor bridging said first holding resistor, a braking control relay, means for energizing said braking control relay upon energization of said armature from said power means, and a normally open braking control relay contactor bridging said second holding resistor.

11. A turret lathe having a spindle motor with an armature, an armature rectifier for supplying rectified A. C. power to said armature, a saddle slidable on said lathe, a turret mounted on said saddle and having six indexable positions, control means for controlling the energization of said spindle motor and hence the speed thereof, said control means including a rotary switch rotated in accordance with the rotation of said turret, said rotary switch having a contactor in each of twelve positions with the odd-numbered contactors thereof corresponding to said six indexable positions of said turret, six indexing relays each energizable by the actuation of one of said odd-numbered contactors, respectively, a forward relay energizable by the energization of any of said six indexing relays to provide forward rotation of said spindle motor, connection means interconnecting said odd-numbered contactors of said rotary switch and said control means to provide variable forward rotational speeds of said spindle motor in each of said indexable positions, a reverse pick-up switch actuable by said slidable movement of said saddle with said turret in one of said indexable positions, a reverse relay energizable by the actuation of said reverse pick-up switch to provide reverse rotation of said spindle motor, a reverse control contactor on said reverse relay to de-energize all of said indexing relays and hence render ineffective the control established thereby, a release control relay energizable upon actuation of any of the even-numbered contactors of said rotary switch for de-energizing said reverse relay to thereby condition said control means for forward rotational direction of said spindle motor under the control of one of said six indexing relays, dynamic braking means for dynamically braking said spindle motor during the time when neither forward nor reverse relays are energized, said dynamic braking means including means for disconnecting said armature and connecting a dynamic braking resistance thereacross, control voltage means capable of energizing said forward or reverse relays, a first holding resistor serially connected with said forward and reverse relays and having a resistance value sufficient to prevent pull-in of either of said relays upon subjection of said series combination to said control voltage and insufficient to cause drop-out of said relays after one of said forward or reverse relays has pulled in, a braking relay and a second holding resistor serially connected across said armature with said second holding resistor having a resistance value sufficient to prevent pull-in of said braking relay on normal armature voltage applied to said last named series combination and insufficient to cause drop-out of said braking relay on normal armature voltage after said braking relay has been energized, a normally closed braking relay contactor bridging said first holding resistor, a braking control relay, means for energizing said braking control relay upon energization of said armature from said armature rectifier, and a normally open braking control relay contactor bridging said second holding resistor.

12. A motor, a rotatable member with a given number of indexable positions, energization means connected in circuit with said motor for controlling the energization supplied to said motor and including movable switch means driven in accordance with the rotation of said rotatable member, said movable switch means having twice said given number of positions, the odd numbered positions corresponding to the said given number of indexable positions of said rotatable member to provide different speed conditions for each of said indexable positions, reversing means for providing reversal of said motor, and circuit means controlled by the even numbered positions providing for relieving the reverse rotation of said motor under the control of said reversing means.

13. A motor, a rotatable member with a given number of indexable positions, drive means for energizing said motor, control means for providing variable amounts of energization of said drive means to provide varying speeds to said motor, said control means including a switch driven in accordance with the position of said rotatable member, said switch having twice said given number of positions with the odd-numbered positions thereof corresponding to said given number of indexable positions of said rotatable member, connection means interconnecting said odd-numbered positions of said switch and said control means to provide different amounts of energization of said drive means and hence providing different motor speed conditions in each indexible position, a reversing switch for at least one of said indexable positions to provide reversed rotation of said motor, and circuits connected to the even-numbered positions of said switch providing for relieving the reverse rotation of said motor under the control of said reversing switch.

CLAUDE E. GREENE.
ROBERT B. LESHER.

References Cited in the file of this patent
UNITED STATES PATENTS

| Number | Name | Date |
| --- | --- | --- |
| 1,193,258 | Gorman | Aug. 1, 1916 |
| 1,269,489 | Murphy | June 11, 1918 |
| 1,551,860 | Yingling | Sept. 1, 1925 |
| 1,709,674 | Kuhl | Apr. 16, 1929 |
| 1,934,506 | King et al. | Nov. 7, 1933 |
| 2,209,037 | Riegger | July 23, 1940 |
| 2,338,599 | Ridgway | Jan. 4, 1944 |
| 2,376,552 | Nelson et al. | May 22, 1945 |
| 2,405,686 | Clark | Aug. 13, 1946 |
| 2,415,492 | Hines | Feb. 11, 1947 |
| 2,542,421 | McClelland | Feb. 20, 1951 |